United States Patent [19]

Dester et al.

[11] 3,897,980

[45] Aug. 5, 1975

[54] SPROCKET TOOTH ENGAGING TRACK NOISE SUPPRESSION MEANS

[75] Inventors: Delbert D. Dester, Washington; Roger L. Boggs, East Peoria; Harold L. Reinsma, Dulay; Maurice E. Young, Washington, all of Ill.

[73] Assignee: Caterpillar Tractor Co., Peoria, Ill.

[22] Filed: Apr. 5, 1974

[21] Appl. No.: 458,243

[52] U.S. Cl............................ 305/57; 74/243 R
[51] Int. Cl............................................. B62d 55/20
[58] Field of Search ... 305/57, 36; 74/243 R, 243 S, 74/245 S, 250 S

[56] References Cited
UNITED STATES PATENTS

| | | | |
|---|---|---|---|
| 3,563,614 | 2/1971 | Parks | 305/57 |
| 3,567,294 | 3/1971 | Simpson | 305/57 |

*Primary Examiner*—Philip Goodman
*Attorney, Agent, or Firm*—Phillips, Moore, Weissenberger Lempio & Strabala

[57] ABSTRACT

A noise attenuating system for the tracks of a tracklaying vehicle. A plurality of noise attenuating devices are disposed about the track chain of a track-laying vehicle, one device mounted upon each track shoe. Each device is comprised of a preloaded spring means in the form of a block or pad of elastomeric material and each device is mounted upon the inner circumferential portion of an individual track shoe. A wear plate means is included for directly engaging the radially outermost portions of the teeth of the driving sprocket of the track-laying vehicle. The devices are disposed so that the outermost edges of the sprocket teeth engage the wear plates prior to engagement of the track bushings with the sprocket notches and are also disposed so that metal-on-metal contact between the leading and trailing edges of each respective link shoe is preceeded by contact between each respective leading edge and the elastomeric material from which the spring means are composed.

10 Claims, 4 Drawing Figures

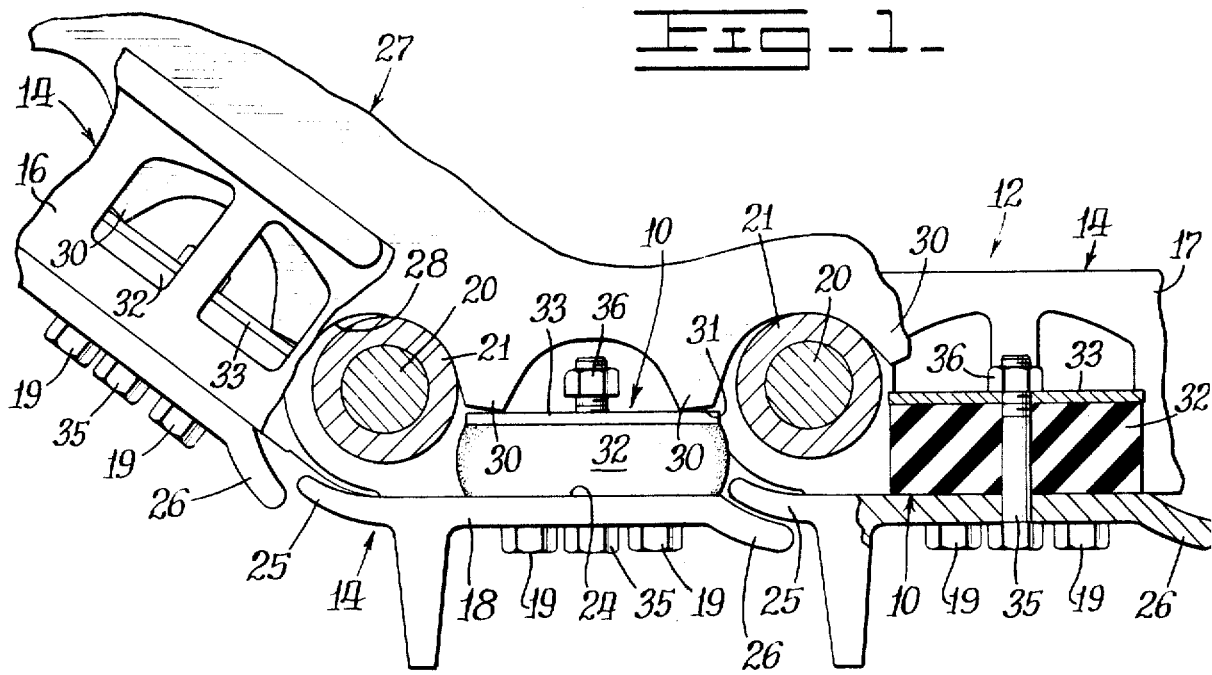
Fig_1_
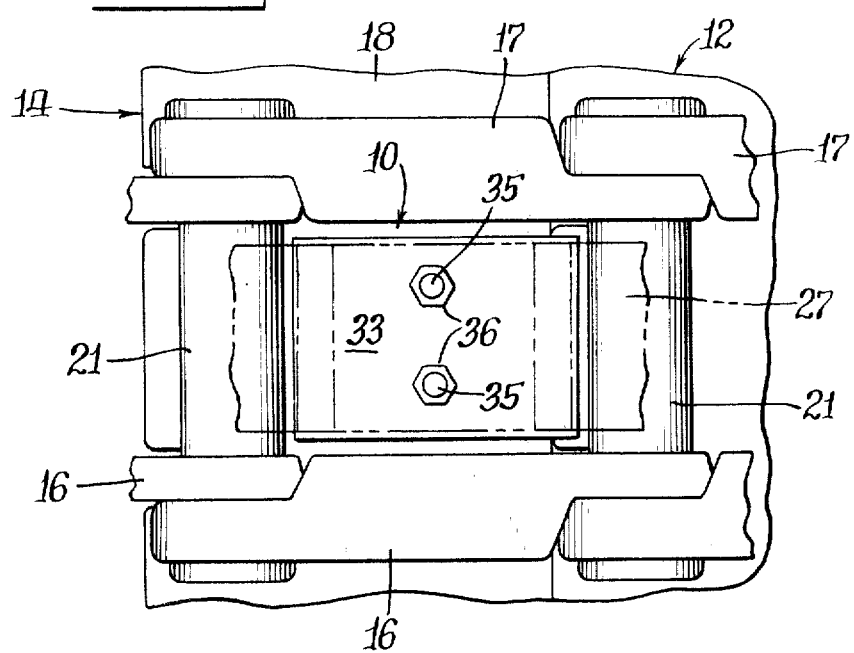
Fig_2_

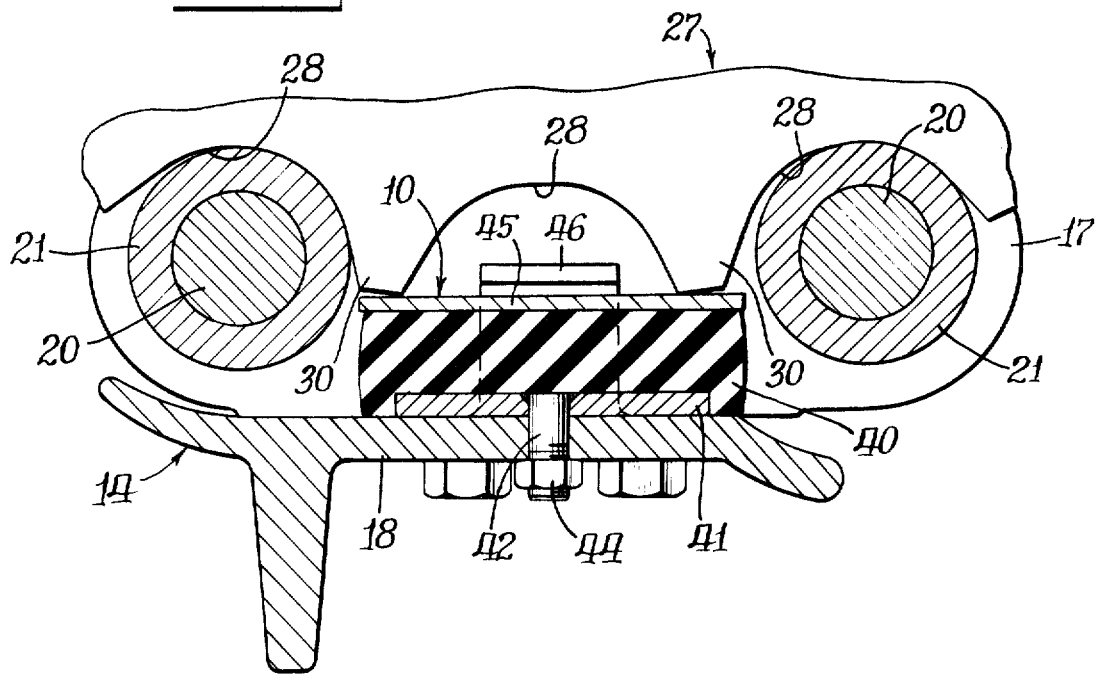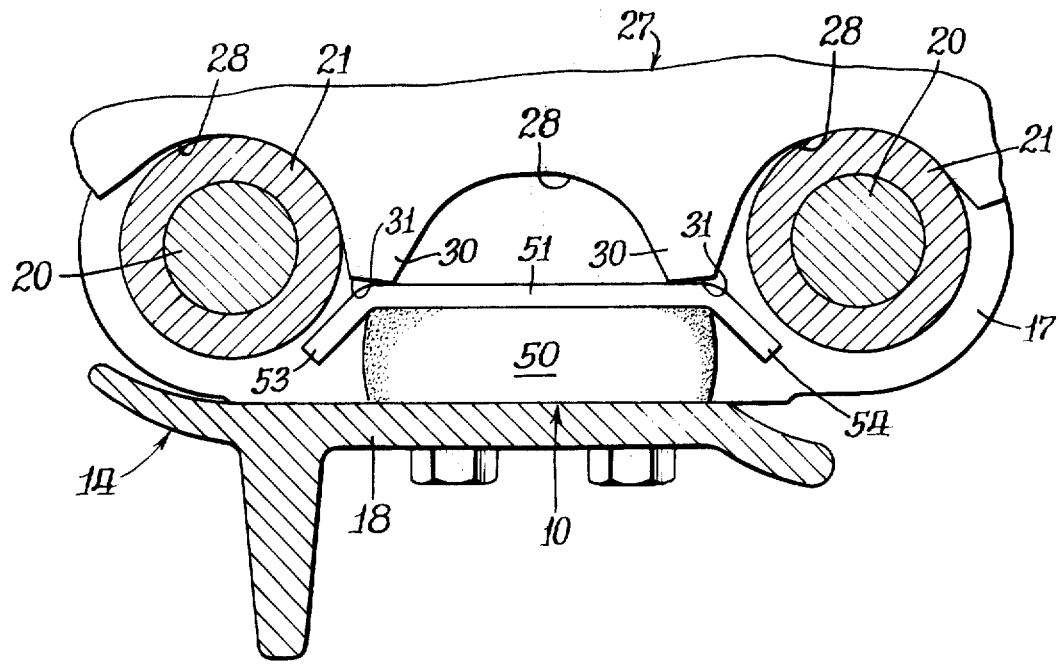

SPROCKET TOOTH ENGAGING TRACK NOISE SUPPRESSION MEANS

BACKGROUND OF THE INVENTION

Recent legislation applicable to earthmoving vehicles has imposed stringent limitations upon the noise levels to which operators of such vehicles and bystanders may be exposed. To adequately meet these limitations and to protect persons and the environment from excessive noise levels, accoustical systems for noise producing components of earthmoving mechanisms have been developed. An example of such noise attenuation systems is found in United States Patent Application Ser. No. 453,091 filed on 3/20/74 by Harold L. Reinsma, now U.S. Pat. No. 3,854,345 and entitled Noise Attenuating Impact Absorbing Means for Sprocket Teeth and Track, of common assignment herewith.

The particular noise producing components treated herein are the sprocket wheel driven track chains of track-laying vehicles. In such vehicles, noise is created by the impact of engagement of the track chain bushings and the notches of the sprocket wheel as such track chains are being driven thereabout. The noise is generated by the metal-to-metal contact of the track bushings and notches on the rotating sprocket wheel.

Track-laying systems where some means are provided for cushioning impact and absorbing noise are described in U.S. Pat. No. 2,003,528; 2,412,122; 3,057,219; 3,563,614; and 3,680,929.

It is highly desirable to provide economical and efficient noise suppression means for mounting on the track chain of a track-laying vehicle which means are capable of withstanding the wear and severe impact forces generated as the track chain wraps and unwraps from the sprocket wheel.

SUMMARY AND OBJECTS OF THE INVENTION

The present invention provides noise attenuating means for cushioning the impact of track bushings upon the notches of the drive sprocket with consequent noise reduction in tracklaying vehicles. The system includes a plurality of impact and noise absorbing devices mounted on the track chain of such vehicles. Each device includes a spring means or pad member of resilient elastomeric material and a wear plate for directly engaging the end portions of the teeth of the sprocket. Each device is disposed upon a track shoe intermediate the respective bushings for the link to which the shoe is attached. The spring means are precompressed by means in the device so as to protect and enhance the energy absorbing characteristics of the spring pad member. The devices are disposed so that they are engaged by the end portions of the sprocket teeth prior to the engagement of the track bushings with the sprocket notches. The devices are also disposed such that they bias the track chain away from the sprocket wheel to quickly remove track bushings from the notches after the termination of driving effort so as to reduce scrubbing of the components. The devices also provide a resilient engaging surface for the leading edge of each succeeding track shoe so that the leading edge encounters resilient material prior to encountering a metal surface of the adjacent track shoe.

It is an object of the present invention to provide economical effective noise suppression means for substantially reducing noises emanating from the forceful engagement of track chain bushings with sprocket wheel notches.

It is another object of the present invention to provide a plurality of noise reducing impact absorbing devices disposed circumferentially interiorally about the track chain of a tracklaying vehicle betwixt the track bushings of each respective link.

A further object of the invention is to provide such a noise attenuating device wherein resilient elastomeric compression springs absorb the impact associated with the engagement of the track chain with the sprocket notches wherein such compression springs are protectively shielded by wear plate means which directly engage the metallic outer radial portions of the teeth of the sprocket wheel.

Still another object of the present invention is to provide a track chain for use with a sprocket wheel which utilizes removable noise suppression impact absorbing means for each of the links thereof.

Other objects and advantages of the invention will become apparent from the following description and drawings.

BRIEF DESCRIPTION OF THE DRAWINGS

FIG. 1 is a partial sectional elevation of a tracklaying vehicle showing a sprocket wheel portion and a portion of an engaging track chain;

FIG. 2 is a partial plan view of FIG. 1;

FIG. 3 is a view similar to FIG. 1 but showing an alternate embodiment of the noise suppression means; and FIG. 4 is a view similar to FIGS. 1 and 3 but showing a further modified embodiment of the noise suppression means of the present invention.

DETAILED DESCRIPTION

With reference to the drawings, particularly FIGS. 1 and 2 thereof, the noise suppressing means of the present invention are indicated generally at 10 and are shown in association with an endless track chain 12. The endless track chain is constructed from a plurality of articulately coupled link sections 14, each of which includes a pair of laterally spaced link members 16 and 17 and a track shoe member 18 which is secured to the link members by means of bolts 19. Each track section is articulately coupled to its adjacent track sections by means of pins 20 and bushings 21. The track shoe member 18 has an inner surface 24 and a leading edge 25 which underlies a trailing edge 26 of adjacent shoes.

The track chain 12 is rotatably mounted upon a drive sprocket 27 which sprocket has a plurality of circumferentially disposed angularly spaced notches 28 formed thereon for providing a plurality of radially extending tooth members 30 therebetween. Each tooth member has a flat radially outermost portion 31. The drive sprocket 27 is of the "hunting" type and has an odd number of notches which are spaced apart one half the pitch length between the track bushings so as to provide a sprocket having two sets of alternately used teeth for driving the track chain.

The noise suppression means 10 include a rubber or other elastomeric material compression pad or spring means 32 disposed within the space between adjacent track bushings 21 of each link section. The spring means are also interposed between the link members 16 and 17 and are supported upon the track shoe 18. A hardened wear metal plate means 33 is bonded to the sprocket engaging side of the spring means and is adapted to engage the outer tips 31 of the sprocket teeth 30, as shown.

The spring means 32 and the wear plate 33 are attached to the inner surface 24 of the track shoe 18 by means of a pair of bolts 35 and nuts 36. The bolts and nuts also serve to adjust the force applied to the spring means 32 so that a preload may be maintained thereupon. It should be noted that the noise suppression device is dimensioned so that contact between a tooth surface 31 and the wear plate 33 is made prior to contact between a bushing 21 and an associated sprocket notch 28. Thus, the substantial impact and concomitant noise occasioned by such bushing-notch contact are greatly abated.

FIGS. 3 and 4 illustrate somewhat modified versions of the noise suppression means shown in FIGS. 1 and 2. Like items are designated by like numerals in all figures.

In FIG. 3, the noise suppression means 10 includes a rubber compression pad 40 which has an inner plate 41 bonded thereto. The plate 41 is provided with a stud 42 for securing the pad 40 to the track shoe 18 by means of a nut 44. A hardened metal wear plate 45 is similarly bonded to the sprocket tooth side of the pad for engaging the tips 31 of the teeth 30. The inner plate 41 is provided with a pair of radially inwardly extending L-shaped arms 46, one of which is shown in FIG. 3. Such arms extend up and over the lateral sides of the wear plate 45 and limit the radial expansion of the compression pad 40 to maintain a preload thereon in a manner similar to that accomplished by the bolts and nuts 35 and 36 in the primary embodiment.

In FIG. 4, the noise suppression 10 includes a compression pad 50 which is bonded to a metal wear plate 51 which plate has obliquely disposed flange portions 53 and 54 which extend beyond the edges of the compression pad 50 to a point beneath the bushings 21, as shown in the drawings. The portions 53 and 54 engage their adjacent bushings 21 upon disengagement of the wear plate 51 from the end portions 31 of the sprocket teeth 30 for maintaining the noise suppression means within the link section and for providing a preload on the compression pad. Because the noise suppression means is literally entrapped within the space provided between the link members, the track shoe, and the bushings, no other means are necessary to secure it to the track shoe, as in the previously discussed cases.

The embodiments of the noise suppression means described supra function so that the respective wear plates 33, 45, and 51 make contact with the tips 31 of the sprocket teeth 30 prior to the engagement of the bushings 21 within the sprocket notches 28. The relative engagement velocities of the bushings with the sprocket notches are reduced through the absorption and storage of energy in the compression pads 32, 40, and 50. The preload provided in each of the compression pads improves the fatigue life of the material used and increases the energy absorption thereof.

The compression pads are dimensioned so that the underlying leading edges 25 of each adjacent track shoe engages one of the compression pads before engaging one of the trailing edges 26 of the adjacent shoe. This reduces the noise occasioned by metal-to-metal contact between such components.

The compressive load rate of the spring means are sufficient to force those bushings which are not in full driving engagement with a sprocket notch to move out of engagement therewith as the track wraps and unwraps from the sprocket during operation. As a result, the serious wear producing "scrubbing" action normally occasioned during such wrapping and unwrapping is obviated.

Although the invention has been described with reference to the preferred embodiments, it is apparent that modifications are possible within the spirit of the inventive concepts. No limitation with respect to such modifications is intended, except as defined by the scope of the appended claims.

We claim:

1. A track chain for a track-laying vehicle having a plurality of link means articulately coupled together by pin and bushing means, said bushing means being adapted to be driven by sprocket means to drive said track chain at least one of said link means including noise attenuating means for reducing the noise associated with driving said track chain, said noise attenuating means including resilient spring means mounted upon said one link means between its associated bushing means, said noise attenuating means further including wear plate means directly engaging said spring means and adapted for directly engaging the radially outermost teeth portions of said sprocket means.

2. The invention of claim 1 wherein said at least one link means include a ground engaging shoe portion attached to said bushing means by at least one link member, said noise attenuating means being mounted upon said shoe portion.

3. The invention of claim 2 further including holding means for holding said noise attenuating means upon said shoe portion.

4. The invention of claim 3 wherein said holding means exerts a predetermined compressive force upon said spring means to preload said spring means.

5. The invention of claim 4 wherein said sprocket means include notches for engaging and driving said bushing means, said noise attenuating means being disposed upon said shoe portion in relation to said bushing means such that said outermost teeth portions of said sprocket means engage said wear plate means prior to successive engagements of said bushing means and said notches.

6. The invention of claim 3 wherein said holding means include at least one threaded bolt engaging said wear plate means and said shoe portion to hold said spring means between said plate means and shoe portion.

7. The invention of claim 3 wherein said holding means include a holding clamp member attached to said shoe portion and adapted to engage said wear plate means to permit only a predetermined amount of expansion of said spring means.

8. The invention of claim 3 wherein said holding means include a pair of flange means extending laterally outwardly from said wear plate means in the directions of said bushing means for directly engaging said bushing means to limit the possible expansion of said spring means.

9. The invention of claim 3 wherein said spring means is comprised by a pad of elastomeric material.

10. The invention of claim 9 wherein each of said plurality of link means include said noise attenuating means.

* * * * *